United States Patent
Delheur et al.

(10) Patent No.: US 9,914,828 B2
(45) Date of Patent: Mar. 13, 2018

(54) METHOD OF INERTING PIPELINES, BURIED TANKS OR WELLBORES USING AN SAP

(71) Applicant: S.P.C.M. SA, Andrezieux Boutheon (FR)

(72) Inventors: Stéphane Delheur, St Marcellin en Forez (FR); Pierre Lyot, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 191 days.

(21) Appl. No.: 14/367,708

(22) PCT Filed: Dec. 18, 2012

(86) PCT No.: PCT/FR2012/052965
§ 371 (c)(1),
(2) Date: Jun. 20, 2014

(87) PCT Pub. No.: WO2013/104841
PCT Pub. Date: Jul. 18, 2013

(65) Prior Publication Data
US 2015/0047843 A1    Feb. 19, 2015

(30) Foreign Application Priority Data
Jan. 13, 2012    (FR) ..................... 12 50344

(51) Int. Cl.
*E21B 33/13*    (2006.01)
*C08L 33/26*    (2006.01)
*E03F 3/06*    (2006.01)

(52) U.S. Cl.
CPC .............. *C08L 33/26* (2013.01); *E21B 33/13* (2013.01); *E03F 2003/065* (2013.01)

(58) Field of Classification Search
None
See application file for complete search history.

(56) References Cited

U.S. PATENT DOCUMENTS 4,172,066 A * 10/1979 Zweigle .................... C08F 2/32
                                                  166/275
4,282,928 A *  8/1981 McDonald ............. C09K 8/035
                                                  166/268

(Continued)

FOREIGN PATENT DOCUMENTS

FR    1394824 A    4/1965
FR    2551451 A1   3/1985

(Continued)

OTHER PUBLICATIONS

Department of Environmental Protection, Pennsylvania, "Chapter 7: Well Abandonment Procedures," Jan. 7, 2011, retrieved from http://www.dep.state.pa.us/dep/deputate/watermgt/Wc/Subjects/SrceProt/ground/sympos/GrdMonitor-chap7.htm on Jan. 6, 2017.*

(Continued)

*Primary Examiner* — Angela M DiTrani
(74) *Attorney, Agent, or Firm* — Forge IP, PLLC

(57) ABSTRACT

A method of inerting pipelines, or buried tanks or wellbores consisting of preparing a composition including at least one superabsorbent (co)polymer partially or fully swollen in the presence of water, then injecting the composition directly into the pipelines or buried tank or well.

14 Claims, 1 Drawing Sheet

(56) References Cited

U.S. PATENT DOCUMENTS

| | | | |
|---|---|---|---|
| 4,587,308 A | 5/1986 | Makita et al. | |
| 4,635,726 A * | 1/1987 | Walker | E21B 21/16 |
| | | | 166/294 |
| 4,828,033 A * | 5/1989 | Frison | B67D 7/002 |
| | | | 137/615 |
| 7,510,004 B1 * | 3/2009 | Hessert | C08L 1/26 |
| | | | 166/281 |
| 2004/0044126 A1 * | 3/2004 | Rohm | B65D 88/76 |
| | | | 525/54.3 |
| 2004/0168798 A1 * | 9/2004 | Creel | C09K 8/508 |
| | | | 166/270 |
| 2004/0168802 A1 * | 9/2004 | Creel | C04B 28/02 |
| | | | 166/293 |
| 2006/0213662 A1 * | 9/2006 | Creel | E21B 27/02 |
| | | | 166/286 |
| 2011/0095227 A1 * | 4/2011 | Herth | C08F 220/60 |
| | | | 252/194 |

FOREIGN PATENT DOCUMENTS

| | | |
|---|---|---|
| FR | 2559158 A1 | 8/1985 |
| FR | 2646274 A1 | 10/1990 |
| WO | 2010133258 A1 | 11/2010 |

OTHER PUBLICATIONS

International Search Report Application No. PCT/FR2012/052965 Completed: Feb. 20, 2013; dated Feb. 27, 2013 2 pages.

* cited by examiner

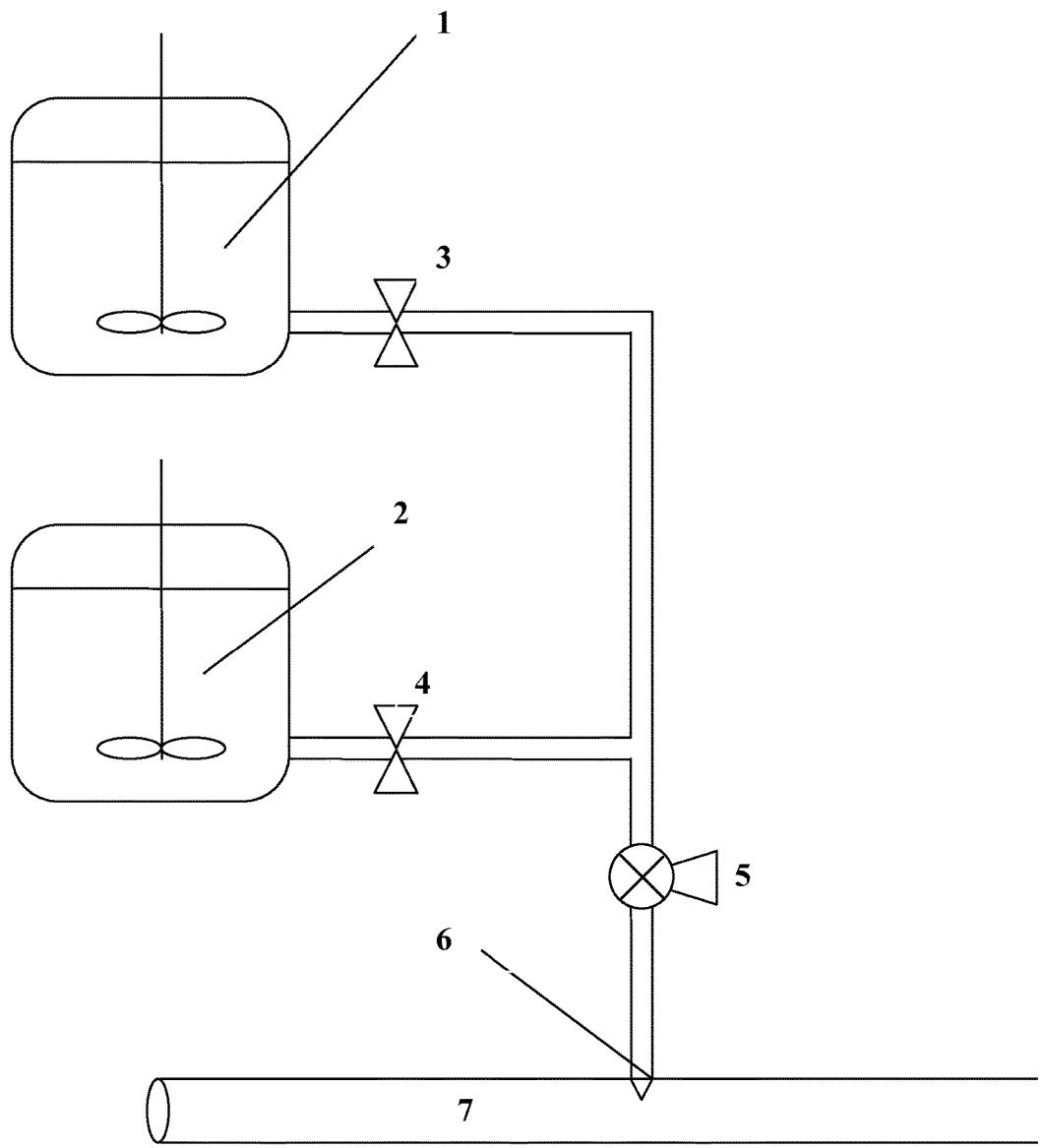

METHOD OF INERTING PIPELINES, BURIED TANKS OR WELLBORES USING AN SAP

FIELD OF THE INVENTION

The invention relates to a method of inerting pipelines, or buried tanks or wellbores.

BACKGROUND OF THE INVENTION

In many countries, the regulations oblige operators to inert unused pipelines as well as any buried tanks. The same applies to dry wells and abandoned wells used in drilling for oil or gas.

The operators of pipeline networks must employ the necessary means so that abandoned or unused pipelines and equipment cannot pose a safety hazards for persons and property.

The purpose of these regulatory requirements is to control the specific hazards that abandoned works may pose to persons or property, owing to:
  the possibility of subsidence;
  drainage to a building of any gas leak or any other fluids;
  potential confusion between works when there are operations in the vicinity.

When a pipeline of the network is no longer to be used, the network operator is to adopt one of the following arrangements in the order of priority given below:
  1) either use it as a sleeve for receiving another pipeline;
  2) or abandon it temporarily with a view to later use as a sleeve;
  3) or abandon it definitively in the ground. In this case the network operator must make arrangements intended to prevent any subsequent hazards of accident or land subsidence.

The arrangements to be made for eliminating these hazard are the inerting of pipelines.

"Inerting of abandoned pipelines, tanks or wells" means filling them with an inert substance for said abandoned pipelines, tanks or wells. In general, once filling has been carried out, the open ends are plugged to contain and protect the substance injected.

The pipelines may be:
  gas pipes,
  pipelines for water (in many cases such as irrigation, there is no such obligation).

Most often, the operators try to inert the pipelines temporarily and reuse them after variable time periods.

One solution for inerting pipelines consists of filling the pipeline with a slurry of sand. This technique is still difficult to apply because plugs form, preventing propagation of the sand. Moreover, if propagation is forced with high-pressure pumps, filling is incomplete. Finally, it is particularly difficult to unblock pipework with high-pressure pumps, as the pressure required may be greater than the strength of the pipes.

Another solution consists of injecting relatively homogeneous lean concrete using concrete pumps. However, such an operation is only possible over short distances, section by section, as the concrete pumps used for public works have limited pressures. Moreover, the use of high-pressure concrete pumps presents a risk of explosion of the pipelines, which condemns them definitively.

In the case of abandoning and of inerting pipelines in urban areas for example, the inerting operations are very expensive. In fact, to inject lean concrete, it is necessary to open up or drill the ground, roads or sidewalks every 100 or 200 meters. It is not in fact possible to push concrete beyond these distances. Moreover, the equipment for carrying out this drilling is bulky and expensive. Repairing road surfaces damaged during these operations is also expensive and causes a lot of inconvenience for traffic.

Regarding drilling for gas or oil, the regulations apply to dry wells or to abandoned wells.

Very often, dry wells are filled with sand or lean concrete, or partly sand with a concrete covering. For places with difficult access such as frozen lakes or offshore drilling, transport is particularly expensive, requiring the use of helicopters.

Finally, the tanks referred to in the invention are most often at old, disused service stations or are individual buried gas tanks.

SUMMARY OF THE INVENTION

The invention proposes to overcome these difficulties, and to achieve the following objectives:
  a method that is simple to use and is less destructive,
  a method using a product that:
    is cheap, consisting in particular of water,
    is easy to transport with light trucks,
    causes little head loss during pumping,
    can be extracted by pumping water,
    is stable for several years, once injected into the pipeline, tank or well.

The applicant has developed a method that is able to achieve all of these objectives, using superabsorbent polymers (SAPs) with a high degree of swelling in water.

More precisely, the invention relates to a method of inerting pipelines, or buried tanks or wellbores consisting of:
  preparing a composition comprising at least one superabsorbent (co)polymer that is partially or fully swollen in the presence of water,
  then injecting the composition directly into the pipelines or the buried tank or the well.

Preferably, the method of the invention comprises an additional step which, once injection has been carried out, consists of sealing the openings of the pipelines, tanks or wells. Sealing makes it possible, depending on circumstances, to contain and/or protect the injected composition, for example against risks of oxidation, or against bacteria that might cause premature degradation of the partially or fully swollen SAP. Various techniques may be used, for example addition of a cover, a valve, or a screwed or glued metal plug, injection of a foam of the expanded polyurethane type, or else cementing or addition of plaster.

For the applications envisaged, the partially or fully swollen (co)polymer must be stable. Stability of the swollen SAP means its capacity for remaining over time in the form of swollen SAP and for withstanding the salts, the metal ions resulting from corrosion of the pipelines or tanks, oxygen dissolved in water, temperature, the various residual contaminants of the pipelines, tanks or wells, for example hydrocarbons, oxidizing and reducing agents. It is known that these parameters may cause destruction of the three-dimensional network of the superabsorbent.

By definition, these polymers are crosslinked. The polymers according to the invention are injected in the form of partially or fully swollen superabsorbents. There are numerous types of water-soluble polymers that are crosslinked, or crosslinkable, natural or synthetic: polyvinyl alcohol, guar, alginates, carboxymethyl cellulose, dextran, xanthan, poly (ethylene oxide), etc.

The superabsorbents are polymers that are well known in the field of specialty chemicals. They are generally in the form of powder. Their structure, based on a three-dimensional network that may be likened to a multitude of small cavities each having the ability to deform and absorb water, gives them the property of absorbing very large amounts of water, so that they swell. Such polymers are described for example in patent FR 2 559 158, which describes crosslinked polymers of acrylic or methacrylic acid, crosslinked graft copolymers of the polysaccharide/acrylic or methacrylic acid type, crosslinked terpolymers of the acrylic or methacrylic acid/acrylamide/sulfonated acrylamide type and the alkali-metal or alkaline-earth salts thereof.

As already mentioned, the main characteristic of these polymers is a high capacity for swelling in an aqueous medium. They can absorb and store large amounts of water, up to 100 or more times their mass of liquid. They are used notably in agriculture for water retention in soil, in hygiene products for babies intended to contain urine, and similar applications.

Advantageously, industrial polymers are selected from the group comprising:
- crosslinked copolymers derived from the polymerization of acrylamide and of partially or fully salified acrylic acid, preferably in the form of a sodium salt or potassium salt,
- crosslinked polyacrylic acids, partially or fully salified, preferably in the form of a sodium salt or potassium salt, which is more sensitive to the salinity of the water and in particular to divalent salts such as $Ca^{2+}$ and $Mg^{2+}$.

In a preferred embodiment, the (co)polymers are crosslinked copolymers of acrylamide and partially or fully salified acrylic acid and will contain between 40 and 90 mol % of acrylamide and between 10 and 60 mol % of partially or fully salified acrylic acid.

In a particular embodiment, the SAP is a terpolymer obtained by the polymerization of acrylamide and/or partially or fully salified acrylic acid and/or partially or fully salified ATBS (acrylamido tert-butyl sulfonate) and/or NVP (N-vinylpyrrolidone) and/or acryloyl morpholine and/or partially or fully salified itaconic acid.

Other hydrophilic monomers, but also monomers with a hydrophobic nature, may be used for producing the polymers.

The polymers are crosslinked with 100 to 6000 ppm of at least one crosslinking agent selected from the group comprising acrylic compounds, for example methylene bisacrylamide, allylic compounds, for example tetra-allylammonium chloride, vinylic compounds, for example divinyl benzene, diepoxy compounds, metal salts etc.

These polymers can be stable for several years in pipelines or tanks.

The stability can be improved by employing double crosslinking with an acrylic crosslinking agent, advantageously in a proportion from 100 to 1000 ppm, for example MBA (methylene bisacrylamide), and an allylic crosslinking agent, advantageously in a proportion from 1000 to 5000 ppm, for example tetra-allylammonium chloride, which extends the stability of the SAP to more than 5 years.

It can also be improved by adding stabilizers to the composition, as described in patent application WO 2010/133258. These are for example oxygen reducing agents such as dithionite, free radical trapping agents such as mercaptobenzothiazole (MBT), and sacrificial agents such as isopropanol, which offer some advantage for the resistance of the polymers in rusted pipelines.

The SAPs are more stable in a slightly basic environment. That is why they are often mixed with 5-10% calcium carbonate or smaller amounts of base such as sodium carbonate, phosphate, polyphosphate, etc. This addition also prevents problems of corrosion of pipelines. A bactericide is often added that prevents the growth of sulfate reducing bacteria, especially when ATBS is used.

Stability in a basic anaerobic environment is several tens of years especially with stabilization with an anaerobic bactericide and/or one or more oxygen reducing agents such as sulfite, bisulfite or dithionite.

Moreover, injection can be improved by adding a friction reducing agent to the composition, for example water-soluble linear polymers of high molecular weight.

In other words, the composition injected may, besides the partially or fully swollen SAP, comprise at least one of the following elements:
- Stabilizers;
- alkaline agents;
- anaerobic bactericides;
- friction reducing agents.

The swelling of these SAPs in distilled water generally reaches 150 to 200 times, or even 500 times, but, in standard potable water, about 100 times and less for very saline water.

Therefore it takes 10 kg of polymer and 990 kg of water to make a tonne of "solid water" for swelling of 100 times.

The polyacrylamides are able to produce swollen SAPs that are more rigid and less sensitive to divalent metals than the polyacrylates.

Advantageously, the SAP will be swollen partially to increase its resistance over time, as the tension of the network will be less. More precisely, it will be advantageous to swell the SAP to 10 to 80%, preferably to 30 to 60% of the maximum swelling capacity.

The SAP may be coated, before swelling, with agents that delay swelling, for example oils, siliconized products or polyvinyl alcohols, which will allow the swelling delay to be controlled.

Application is quite simple and comprises the following successive steps:
- preparing a composition comprising the SAP, which is partially or fully swollen in water, in a stirred or unstirred tank;
- injecting the composition directly from the tank into the pipeline or storage tank with a low-speed positive-displacement pump of the Moineau type. The product fills the storage tank or advances in the pipeline in the form of a plug without segregation. The limit on pumping distance is determined by the pressure of the pump relative to the resistance of the pipe. It is generally several kilometers on pipelines above 3 inches in diameter. Most pipelines have buffers or inspection holes distributed over the distance allowing both visualization of the arrival of swollen SAP and new injection.

In another embodiment, the composition based on swollen superabsorbent is prepared in the factory, and is then transported by road tanker to the treatment site and the composition is injected under air pressure or with a positive-displacement pump.

When inerting a pipeline, it is possible to inject a scraper (pig) of the pipe dolly or hinged type equipped with a transmitter allowing the progress of the product to be tracked. A scraper of the pipe dolly type is a kind of plug with the same diameter as the pipeline, generally made of high-density polyurethane foam, which is pushed along by the composition comprising the swollen SAP.

It is also possible to inject the composition comprising the SAP and water immediately after mixing them. In this case the SAP will only have swollen very slightly and this may make it possible to reduce the injection pressure and increase the distance over which the composition will be injected from a single injection point.

A person skilled in the art will be able to use the techniques at his disposal in order to slow the swelling of the SAP, for example choosing a granulometry of the SAP above 1 mm.

When wells used for extraction of petroleum or gas reach the end of their useful life, it is necessary to inert them. In this case, the partially or fully swollen SAP is introduced into the well via its main orifice and preferably by means of the double wall of the drilling equipment and casing (metal tube used for drilling). When the wells are located in particular zones, for example on a frozen lake, water from the lake is used for swelling the polymer. For example, it takes 1 g of polymer to make 100 g of gel, whereas it is necessary to transport 200 to 300 g of materials in the case of sand or lean concrete.

Advantageously, after filling the pipeline or storage tank, a plug of cement of some meters is cast.

Over time, visual inspection of the state of the swollen SAP can easily be carried out from the inspection holes arranged along the pipelines for example.

When after some years the swollen SAP has partially lost its swollen state, an operation of injection of the composition according to the invention can be repeated.

In certain cases, the residue of swollen SAP can easily be removed by injecting water under pressure, with or without previous injection of a pig.

The invention and the advantages resulting therefrom will be clear from the following example, referring to the appended drawing.

BRIEF DESCRIPTION OF THE DRAWINGS

FIG. 1 is a representation of an installation employing the method of the invention according to one embodiment.

DETAILED DESCRIPTION OF THE INVENTION 15 kg of superabsorbent Aquasorb Block (acrylamide/sodium acrylate copolymer, 70 mol %/30 mol %) is added to 900 liters of water and mixed with a stirrer (speed 100 rev/min) in a container (1) for 25 minutes. Valve (3) is then opened and the pump (5) of the Moineau type is switched on for injecting the swollen SAP into the pipeline (7) via the injection point (6). The pipeline has a length of 1100 meters, 750 m of which has a diameter of 100 mm and 350 m has a diameter of 150 mm, i.e. a volume to be filled of about 12 m$^3$.

During injection, the same composition (15 kg of SAP in 900 liters of water) is mixed in container (2). Once container (1) has been emptied, valve (4) is opened and valve (3) is closed again. It is then the contents of container (2) that are injected. The operation is continued until the injection pressure increases, which reflects complete filling of the pipeline.

Finally 20 kg of concrete is injected at each end of the pipeline.

A person skilled in the art will be able to adapt these basic conditions to the local characteristics for inerting.

The invention claimed is:

1. A method of inerting an abandoned pipeline, buried tank or well having an opening, said method comprising the steps of:
    preparing a composition consisting essentially of at least one superabsorbent (co)polymer partially swollen in the presence of water and optionally at least one of the following elements:
    stabilizers;
    alkaline agents;
    anaerobic bactericides; and
    friction reducing agents;
    and then injecting the composition directly into the abandoned pipeline, buried tank or well until the abandoned pipeline, buried tank or well is completely filled,
    wherein the abandoned pipeline, buried tank or well had been abandoned prior to said injecting step;
    wherein the at least one superabsorbent (co)polymer has a granulometry above 1 mm; and
    wherein the at least one superabsorbent (co)polymer is swollen to 10 to 80% of its maximum swelling capacity.

2. The method as claimed in claim 1, wherein, once injection has been carried out, the opening of pipeline, buried tank or well is sealed.

3. The method as claimed in claim 2, wherein sealing is carried out by means of a cover, a valve, a screwed or glued metal plug, by injecting foam of an expanded polyurethane, by cementing or addition of plaster.

4. The method as claimed in claim 1, wherein the superabsorbent (co)polymer is a polymer selected from the following:
    crosslinked copolymers derived from the polymerization of acrylamide and of partially or fully salified acrylic acid,
    crosslinked polyacrylic acids, partially or fully salified.

5. The method as claimed in claim 4, wherein the polymer is in the form of a sodium salt or a potassium salt.

6. The method as claimed in claim 1, wherein the superabsorbent (co)polymer is a crosslinked copolymer of acrylamide and of partially or fully salified acrylic acid and contains between 40 and 90 mol % of acrylamide and between 10 and 60 mol % of partially or fully salified acrylic acid.

7. The method as claimed in claim 1, wherein the superabsorbent (co)polymer is a crosslinked terpolymer obtained by polymerization of acrylamide and/or of partially or fully salified acrylic acid and/or of partially or fully salified ATBS (acrylamido tert-butyl sulfonate) and/or of NVP (N-vinylpyrrolidone) and/or of acryloyl morpholine and/or of partially or fully salified itaconic acid.

8. The method as claimed in claim 1, wherein the superabsorbent (co)polymer undergoes a double crosslinking with an acrylic crosslinking agent in a proportion from 100 to 1000 ppm and with an allylic crosslinking agent in a proportion from 1000 to 5000 ppm.

9. The method as claimed in claim 8, wherein the acrylic crosslinking agent is MBA (methylene bisacrylamide) and wherein the allylic crosslinking agent is tetra-allylammonium chloride.

10. The method as claimed in claim 1, wherein the superabsorbent (co)polymer is swollen to 10 to 60% of its maximum swelling capacity.

11. The method as claimed in claim 1, wherein a pig is injected prior to injection of the composition.

12. The method as claimed in claim 1, wherein the composition based on the partially swollen superabsorbent (co)polymer is prepared in a factory, then transported by road tanker to a treatment site and the composition is injected under air pressure or with a positive-displacement pump.

13. The method as claimed in claim 1, wherein the composition based on the partially swollen superabsorbent (co)polymer is removed by injecting water under pressure, with or without a previous injection of a pig.

14. The method as claimed in claim 1, wherein injection is repeated after some months or some years.

* * * * *